W. J. STEINLE.
DEVICE FOR LAYING TIRE FABRIC ON CORES.
APPLICATION FILED SEPT. 24, 1915.
1,272,555.
Patented July 16, 1918.
2 SHEETS—SHEET 1.
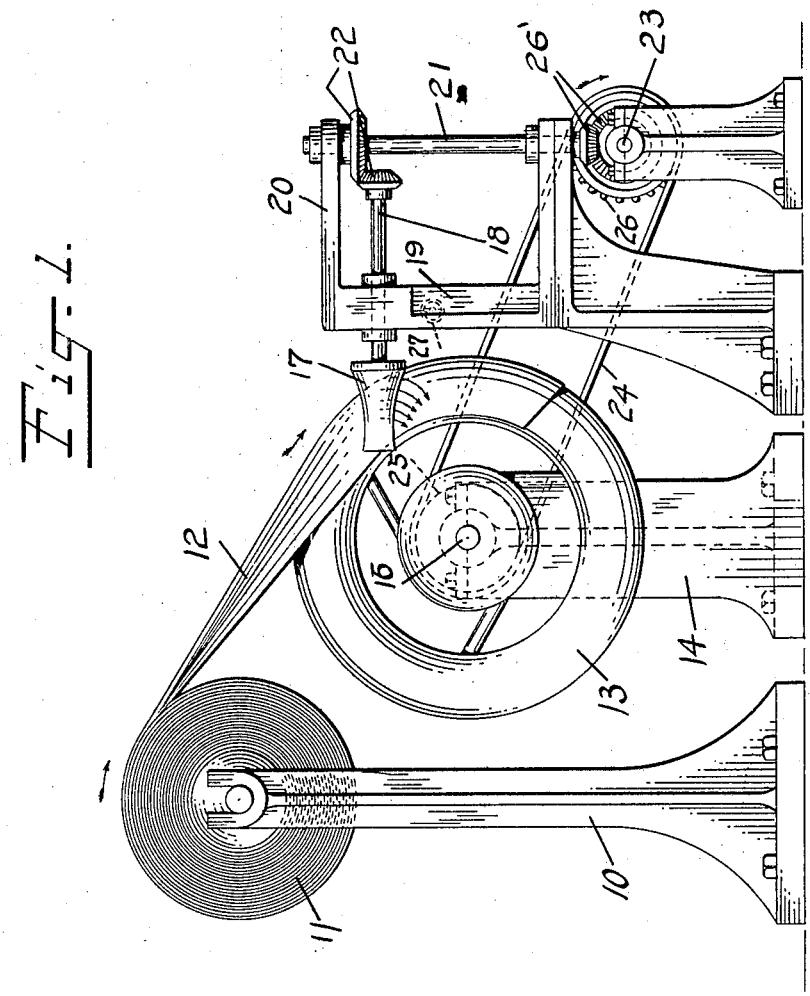
WITNESS:
S. G. Taylor
INVENTOR
William J. Steinle,
BY
Ernest Hopkinson
HIS ATTORNEY W. J. STEINLE.
DEVICE FOR LAYING TIRE FABRIC ON CORES.
APPLICATION FILED SEPT. 24, 1915.
1,272,555.
Patented July 16, 1918.
2 SHEETS—SHEET 2.
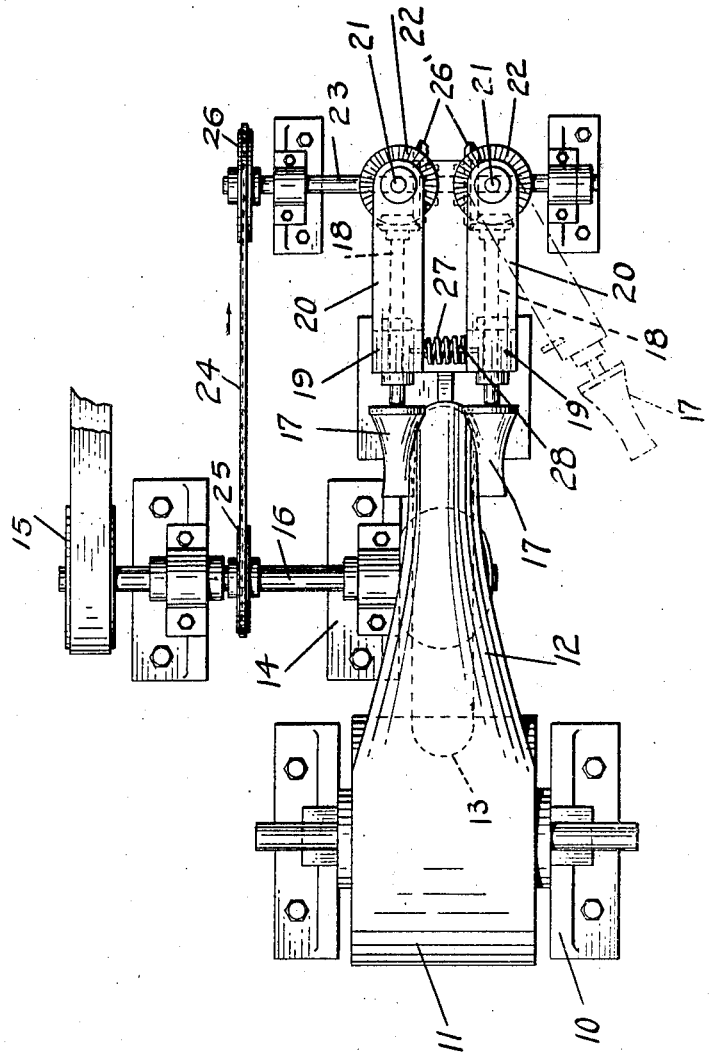
WITNESS:
INVENTOR
William J. Steinle,
BY
HIS ATTORNEY

UNITED STATES PATENT OFFICE.

WILLIAM J. STEINLE, OF ELMHURST HEIGHTS, NEW YORK, ASSIGNOR TO RUBBER REGENERATING COMPANY, A CORPORATION OF INDIANA.

DEVICE FOR LAYING TIRE FABRIC ON CORES.

1,272,555.  Specification of Letters Patent.  Patented July 16, 1918.

Application filed September 24, 1915. Serial No. 52,352.

*To all whom it may concern:*

Be it known that I, WILLIAM J. STEINLE, a citizen of the United States, residing at Elmhurst Heights, L. I., county of Queens, State of New York, have invented certain new and useful Improvements in Devices for Laying Tire Fabric on Cores, of which the following is a full, clear, and exact description.

This invention relates to devices used in connection with tire building machines to lay tire fabric on the tire-forming core, and has for an object to provide a simplified and improved apparatus for pressing the fabric to partake of the configuration of the ring core.

In constructing a tire, it is customary to employ a revoluble ring core, upon which strips of bias-cut rubber treated fabric are wound from a stock roll of the material. In practice a round of the fabric is drawn on to the ring core from the stock roll, while the ring core is power-turned slowly through one revolution. The ring core is then halted and the fabric thereon is severed from the fabric supply. Then the ring core is revolved rapidly and during this fast rotation of the ring core, spinning rolls or disks are moved bodily over the fabric in a radial direction from the crown of the core toward the bead portions thereof and shape and press the fabric to conform intimately to the configuration of the core.

The present invention obviates the above described step of imparting a high rotary speed to the ring core, and provides a means for effectively shaping the fabric upon the ring core substantially as fast as it arrives from the fabric supply to the ring core during the slow revolutions made by the ring core when taking on the fabric. This is accomplished by stationing shaping rollers at a predetermined portion of the core, said rollers being so positioned and having such surface configuration as to press the fabric to conform intimately to the surface configuration of the core, as will hereinafter be fully described and claimed.

With the above and other objects in view, the invention consists of certain novel details of construction and combinations of parts hereinafter fully described and claimed, it being understood that various modifications may be resorted to within the scope of the appended claims without departing from the spirit or sacrificing any of the advantages of the invention.

The invention may be readily understood from the following description taken in connection with the accompanying drawing, in which—

Figure 1 is a side elevation of a tire building apparatus embodying my improvements;

Fig. 2 is a plan view of the parts shown in Fig. 1.

Referring now to the drawings, in which like characters of reference designate similar parts, 10 designates a frame, upon which is mounted a stock roll 11 from which rounds or plies of bias-cut tire fabric 12 are supplied to a tire forming ring core 13. The ring core is revolubly mounted on a frame 14 and is adapted to be power-driven from a pulley 15 fixed to the shaft 16 of the ring core, or otherwise.

In carrying out the invention a pair of shaping rollers 17 are stationed preferably on opposite sides of the core and are adapted to engage simultaneously the side portions of the fabric and roll the same down upon the core. The rollers have concave surfaces that enable them to conform to the curvature of the sides of the core and shape the fabric to the incurved sides of the core. The rollers furthermore are somewhat conical in longitudinal outline for a like purpose. Furthermore, the rollers have smooth surfaces, so that they roll the fabric down without mutilating the same.

As the surface of the core continually decreases in diameter toward the edges or the bead portions, the flat strip of fabric is usually stretched to conform radially to the crown of the core, and the surplus fabric of the margins usually exists in the form of puckers which must be smoothed out. This is usually done by stitchers which stretch the fabric radially toward the edges of the core. To enable the present tool to perform this function, the axes of the rollers are positioned to extend substantially perpendicular to the vertical central transverse plane of the core and above the axis of the core as shown in Fig. 1. All points on each roller will travel in a vertically downward direction, and since the fabric travels in an oblique direction with respect to the axes of the rollers as indicated by the large arrow-head the rollers will exert a wiping action in a direction toward the edges of the bead portions of the core as indicated by the small arrow heads and as a result the fabric will be stretched radially of the core and all puckers and other inequalities smoothed out.

I may accomplish the same stretching action by positioning the rollers in the horizontal central plane of the tire so that they extend radially, and equipping the surface of each roller with a spiral rib or otherwise altering the surface so that the roller will act as a screw when desired to stretch the fabric radially from the crown portions to the bead portions of the core.

As illustrated, the rollers each engage the fabric from a point near the crown of the core to the bead portions of the core, so that each roller generates an annular zone during a single revolution of the tire throughout all points on which zone the fabric will be rolled down and shaped to the configuration of the core.

The rollers are power driven in the present embodiment, at a predetermined ratio of surface speed relative to the surface speed of the core, and preferably the surface speed of the rollers is greater than the surface speed of the core.

In the present embodiment, for imparting a positive drive to the rollers, each roller is equipped with a drive shaft 18 which is journaled for rotation in a yoke 19, the branches 20 of which are pivotally mounted on a corresponding vertically disposed shaft 21, rotation of the shaft 21 being imparted to the roller shaft 18, preferably by means of meshing bevel gears 22. A shaft 23 is operatively connected to the core shaft 16 by means of a chain 24 and sprockets 25 and 26, whereby the shaft 23 is driven from the core shaft. The shaft 23 is connected to the above mentioned upright shafts 21, by means of meshing bevel gears 26' and drives both shafts 21. As above stated, the chain drive and the gear mechanisms are preferably so proportioned that the surface speeds of both rollers will be identical and will bear a predetermined ratio to the surface speed of the ring core, preferably being driven at a greater surface speed than the surface speed of the ring core.

The rollers are normally held in operative engagement with the sides of the core by means of a helical spring 27, and either roller may be rocked out of operative position to permit removal of a finished carcass and replacement thereof by a ring core, as shown in dotted lines in Fig. 2, and to permit of this, one end of the helical spring 27 is preferably removably secured as shown at 28 to the corresponding yoke 19.

In operation the end of the web of fabric 12 is pressed upon the ring core to which it adheres, and the ring core is then started and rotated at a speed of about ten revolutions per minute. During each single revolution the ring core draws a round of the fabric from the fabric roll on to its periphery, the spring-pressed rollers 17 operating during such rotation of the core to press down and shape the fabric into intimate contact with the surface of the core as fast as it arrives at the core from the fabric supply. The rotation of the core is continued until a sufficient number of superposed plies or layers of the fabric have been laid upon the core to build the carcass to its desired dimensions.

What is claimed is:

1. A tire building machine comprising the combination of a ring core, rollers having their axes disposed substantially perpendicular to the vertical central transverse plane of the core and above the axis of the core for shaping material on the core, and a positive drive for producing rotation of the core and rollers at a predetermined ratio of surface speeds.

2. A tire building machine comprising the combination of a ring core, a pair of rollers having their axes disposed substantially perpendicular to the vertical central transverse plane of the core and above the axis of the core, said rollers being pressed toward the sides of the core and each adapted to intimately press fabric on to the core from near the crown portion of the core to near the edge portion of the core, and a positive drive for producing rotation of the core and rollers at a predetermined ratio of surface speeds.

3. A tire building machine comprising the combination of a ring core, a pair of concave rollers having their axes positioned substantially perpendicular to the vertical central transverse plane of the core and above the axis of the core and serving to shape fabric on the core, and a positive drive for producing rotation of the core and rollers at a predetermined ratio of surface speeds.

4. A tire building machine comprising the combination of a ring core, rollers adapted to engage and shape fabric on the ring core, pivotal mountings for the rollers permitting lateral rocking thereof toward and away from the core, a tension device normally holding the rollers pressed against the core, and means connecting the ring core and rollers for positive driving at a predetermined rate of surface speed relative to each other.

5. A tire building machine comprising the combination of a ring core, a shaft for driving said ring core, a pair of rollers stationed to engage the sides of fabric and shape the same to the configuration of the core, said rollers having their axes disposed substantially perpendicular to the vertical transverse plane of the core and above the axis of the core, a shaft operatively connected to each of said rollers, a shaft operatively connected to the roller shafts for positively driving the rollers, and a positive connection between the core shaft and the last named shaft whereby the last named shaft is positively driven by said core shaft.

Signed at New York, N. Y., September 21, 1915.

WILLIAM J. STEINLE.

the "Commissioner of Patents,